(12) United States Patent
Gres

(10) Patent No.: US 7,064,175 B2
(45) Date of Patent: Jun. 20, 2006

(54) ADHESIVE SYSTEM CONTAINING TANNIN FOR BINDING LIGNOCELLULOSIC MATERIALS

(75) Inventor: Edward M. Gres, Toronto (CA)

(73) Assignee: Mitanic, Inc., Toronto (CA)

( * ) Notice: Subject to any disclaimer, the term of this patent is extended or adjusted under 35 U.S.C. 154(b) by 573 days.

(21) Appl. No.: 10/132,386

(22) Filed: Apr. 26, 2002

(65) Prior Publication Data

US 2003/0203998 A1 Oct. 30, 2003

(51) Int. Cl.
*C08G 18/00* (2006.01)
*C08L 61/00* (2006.01)
*C08L 75/00* (2006.01)

(52) U.S. Cl. .................. 528/85; 524/590; 524/594; 524/597; 527/401; 527/403

(58) Field of Classification Search ............ 524/590, 524/594, 597; 527/401, 403; 528/85
See application file for complete search history.

(56) References Cited

U.S. PATENT DOCUMENTS

| | | | |
|---|---|---|---|
| 4,045,386 A | 8/1977 | Hartman | |
| 4,169,077 A | 9/1979 | Hartman | |
| 4,608,407 A | 8/1986 | Kerimis et al. | |
| 4,950,433 A | 8/1990 | Chiu | |
| 5,019,618 A | 5/1991 | Chiu | |
| 5,047,275 A | 9/1991 | Chiu | |
| 5,223,587 A | 6/1993 | Tsuruta | |
| 5,346,574 A | 9/1994 | Tamura et al. | |
| 5,407,980 A | 4/1995 | Pizzi | |
| 5,456,964 A | 10/1995 | Tamura et al. | |
| 5,532,330 A | 7/1996 | Pizzi et al. | |
| 5,674,338 A | 10/1997 | Parker et al. | |
| 5,705,542 A | 1/1998 | Roffael et al. | |
| 5,942,058 A | 8/1999 | Sleeter et al. | |
| 6,129,871 A | 10/2000 | Suzuki et al. | |
| 6,297,313 B1 | 10/2001 | Hsu | |

2004/0219234 A1 * 11/2004 Nakamoto et al. .......... 424/725

FOREIGN PATENT DOCUMENTS

| | | |
|---|---|---|
| CA | 1074044 | 3/1980 |
| EP | 0 544 927 B1 | 6/1993 |
| GB | 1016623 | 1/1966 |

OTHER PUBLICATIONS

Abstract of Bulgarian Design Patent BG383Y to Josifov et al, published Apr. 28, 2000.

* cited by examiner

*Primary Examiner*—Tae H. Yoon
(74) *Attorney, Agent, or Firm*—Clark & Brody

(57) ABSTRACT

The adhesive system for use in binding lignocellulosic materials into a composite product, the adhesive system consisting essentially of a first part and one of (a) a second part; (b) a third part, and (c) both the second part and the third part; the first part being selected from the group consisting of powdered tannins, powdered modified tannins, and mixtures thereof; the second part being a powdered component reactive with the first part and selected from the group consisting of aldehyde polymers, phenolic resoles, modified phenolic resoles, and mixtures thereof; the third part being a liquid polymeric isocyanate, wherein:
  when the system consists essentially of the first part and (a) the second part, the weight ratio of the first part to the second part is from about 1:99 to about 65:35;
  when the system consists essentially of the first part and (b) the third part, the weight ratio of the first part to the third part is from about 1:99 to about 65:35; and
  when the system consists essentially of the first part and (c) both the second part and the third part, the first part is present in an amount from about 1% w/w to about 64% w/w, the second part is present in an amount of from about 1% w/w to about 64% w/w and the third part is present in an amount of from about 35% w/w to about 99% w/w. A method of forming a composite product using the adhesive system and a composite product made with the adhesive system are also provided.

17 Claims, No Drawings

ADHESIVE SYSTEM CONTAINING TANNIN FOR BINDING LIGNOCELLULOSIC MATERIALS

FIELD OF THE INVENTION

This invention relates to adhesive systems for binding lignocellulosic materials in the manufacture of composite products.

BACKGROUND OF THE INVENTION

Composite products made from lignocellulosic materials include "composite boards", which term is used herein to mean oriented strand boards (OSBs), wafer boards, straw boards, fibre boards, chip boards and particle boards wherein the board substrate is prepared by applying an adhesive to lignocellulosic particles, chips or fibres, specifically wood particles, wood chips and lignocellulosic particles, and subsequently forming the lignocellulosic material into the desired board through application of heat and pressure.

Adhesives currently used by manufacturers of various wood composite products include urea-formaldehyde, phenol-formaldehyde, melamine-urea-formaldehyde, melamine-formaldehyde resins ("UF", "PF", "MUF", "MF"), and isocyanate polymers ("MDI"). For example, U.S. Pat. No. 6,297,313 to Hsu teaches a sprayable liquid adhesive system comprising an aldehyde resin and an isocyanate polymer which are combined prior to being sprayed onto lignocellulosic particles.

At a number of OSB and composite board mills, MDI is the predominant or sole binder system. In some layers in the composite board, MDI has been partially replaced by other resin adhesives including phenolic resin (powder or liquid) to achieve specific properties or costs for the board.

These adhesives suffer from a number of disadvantages. First, the ill-effects of formaldehyde on human health are well known. Many of the above adhesives contain free formaldehyde or release formaldehyde during the manufacturing process. In some cases, formaldehyde is released even from composite boards formed using some of the above adhesives over the useful life of the manufactured board. Isocyanate polymers tend to be safer once the composite board has been through the press, but are still not entirely free of health risks prior to and during application as an adhesive binding system. They can react with moisture on the skin or moisture in the lungs if inhaled as atomized isocyanate polymer or isocyanate polymer-coated wood dust. Also, isocyanate polymers can cause manufacturing problems since they can bond to metals (i.e., metal plates and presses) and are more expensive than other conventional adhesives per unit weight basis.

Second, the above aldehyde polymers are derived from non-renewable petroleum based resources via multiple step chemical processes that often release carbon dioxide and other emissions into the environment. It is therefore desirable to limit their use where possible for environmental reasons.

Raw materials used to manufacture many aldehyde polymers include phenol, formaldehyde and caustic soda, all chemicals that are considered dangerous to handle in the workplace.

Third, liquid adhesive systems tend to suffer from short or limited storage and pot life. "Pot life" means the amount of time following the addition of a catalyst in which the liquid adhesive system is useful for the desired application catalyzed. Liquid systems consist of components which, when mixed, begin to react and cure. After a certain period of time, the system may lose its utility, i.e. cannot be used. With catalyzed aldehyde liquid systems, the individual components must be measured very accurately and be present in certain specified amounts in order to provide a solution which will achieve the desired properties upon curing. For these reasons, powdered adhesive systems are preferred since they do not suffer from the same limited storage and pot life problems.

Tannin has been used as an adhesive component for at least 50 years. It is derived from natural renewable resources (i.e. trees and plants). Certain kinds are widely available, are extracted from the bark of trees cut for lumber, and are not known to cause problems to health. However, the use of tannins in adhesives is not widespread, especially for OSB board manufacture, since most liquid aldehyde tannin adhesives systems suffer from pot life constraints.

Normally, the tannin is used in conjunction with another aqueous based adhesive system, with a catalyst being added to assist in the curing. The catalyst becomes an active part of the binder system for the composite wood being glued. The most common practice is to add a formaldehyde 'donor' to a solution/dispersion of tannin mixed with an aqueous phenolic or urea formaldehyde resin adhesive. The dry weight of tannin to the adhesive normally totals 20% w/w and the formaldehyde source is normally paraformaldehyde or urea-formaldehyde concentrate (UFC 80% w/w or UFC 85% w/w) added at a weight ratio of 1:10 (catalyst:tannin). Although used commercially, these aqueous solution mixed systems suffer from the short pot life of an advancing reacting pre-polymer mixture, and problems with the amount of excess formaldehyde being added to assist in the cross-linking or curing. Few OSB mills have been able to overcome the problems encountered in preparing an efficient tannin containing OSB binder system because of the continuous nature of the OSB panel manufacturing process and because of the problems associated with increased free formaldehyde emissions resulting from the addition of formaldehyde 'donor' catalysts/reactants.

In U.S. Pat. No. 5,407,980 to Pizzi et al., tannin is used as an accelerator to speed up the curing process. This patent teaches a liquid adhesive composition for manufacturing plywood for exterior application including: a) 121 parts by weight phenolic resin: b) 5 to 121 parts by weight isocyanate polymer: c) 1 to 40 parts by weight tannin selected from the group consisting of pine, quebracho, mimosa, and combinations thereof: d) 1 to 15 parts by weight paraformaldehyde or formaldehyde solutions in water: e) 5 to 50 parts by weight of water: and f) an amount of filler comprising inorganic and/or organic materials for providing the composition with the desired viscosity. Pizzi et al. further teaches that the added formaldehyde or paraformaldehyde is necessary to achieve the required hard gel.

Thus, the solution of Pizzi et al. contains added formaldehyde solutions or paraformaldehyde additions. Unreacted formaldehyde escaping during the manufacturing process or from the finished board is a potential health hazard. In addition, like other prior art liquid adhesive compositions, the solution has a limited pot life and the quantity of the various component ingredients such as paraformaldehyde is critical to performance. Due to the rapid advancing polymerization of certain types of tannins (e.g. unhydrolyzed tannins), the Pizzi et al. solution is restricted in terms of the types and amounts of tannin which may be used.

U.S. Pat. No. 5,532,330 also to Pizzi et al. teaches a liquid heat-curable, formaldehyde-free binding agent comprising a polyflavonoid type tannin and, as a curing catalyst, a compound having a weak acid reaction curable at relatively high temperatures and compatible with cellulose containing materials such as wood chips for the production of particle boards. The curing catalyst may be silicon dioxide or boric acid. As the liquid binding agent must be mixed prior to use, it also suffers from the disadvantages of limited pot life and the requirement to precisely measure and mix in the individual components, usually by a batch process up to several times in a day at the board manufacturing plant. Furthermore there is a need to inventory and maintain the quality control of the individual components used to make up the catalyzed adhesive system.

Manufacturers of adhesive systems for composite panels continue to search for supplements to or replacements for adhesives presently used, especially those which are based on urea- and phenol-formaldehyde adhesives and isocyanate polymers because of environmental, health, cost, and performance concerns. There is still a need for new adhesive compositions or systems which (1) can be formulated and used with relative ease while providing a composite board having the desired physical properties; (2) are less harmful to the environment by employing products derived from natural and renewable resources; (3) are less harmful to human health by reducing or eliminating the amount of free formaldehyde released from composite boards, during the lifetime of the finished composite board, and from presses during the manufacturing process; and (4) are relatively cost-effective to manufacture and use. An object of the present invention is to at least partially address these needs.

SUMMARY OF THE INVENTION

It has been found that natural extracted tannins, and post extraction modified tannins, in dry powder form, and preferably in spray dried powder form, can be used to replace a portion of certain adhesives known to have better binding properties, to provide an adhesive system which serves to overcome, at least partially, some of the problems associated with prior art adhesive systems. Surprisingly, tannin and modified tannins may be used in dry form and without any externally added formaldehyde generating "donor" catalyst to provide an adhesive system which is useful in the production of commercially acceptable composite products.

The present invention provides, in accordance with a first aspect, an adhesive system for use in binding lignocellulosic materials into a composite product. The adhesive system consists essentially of a first part and one of (a) a second part; (b) a third part, and (c) both the second part and the third part; the first part being selected from the group consisting of powdered tannins, powdered modified tannins, and mixtures thereof; the second part being a powdered component reactive with the first part and selected from the group consisting of aldehyde polymers, phenolic resoles, modified phenolic resoles, and mixtures thereof; the third part being a liquid polymeric isocyanate, wherein:

when the system consists essentially of the first part and (a) the second part, the weight ratio of the first part to the second part is from about 1:99 to about 65:35;

when the system consists essentially of the first part and (b) the third part, the weight ratio of the first part to the third part is from about 1:99 to about 65:35; and when the system consists essentially of the first part and (c) both the second part and the third part, the first part is present in an amount from about 1% w/w to about 64% w/w, the second part is present in an amount of from about 1% w/w to about 64% w/w and the third part is present in an amount of from about 35% w/w to about 99% w/w.

In one preferred embodiment, the adhesive system consists essentially of the first and second parts and the weight ratio of the first part to the second part is from about 1:99 to about 20:80, preferably from about 6:94 to about 15:85, and more preferably about 1:8.

In another preferred embodiment, the adhesive system consists essentially of the first part and the third part, wherein the weight ratio of the first part to the third part is from about 10:90 to about 65:35, and preferably about 35:65 to about 50:50.

Preferably, the first or second parts are spray dried to achieve the desired and preferred particle sizes and adhesive properties. Most preferably, both the first and second parts are spray dried. Examples of spray dried phenolic resoles and methods for making same are contained and discussed in CA patent number 1,074,044 to Gres et al. and U.S. Pat. Nos. 4,950,433 and 5,019,618, both to Chiu. The disclosures of all of these references are herein incorporated by reference. Similar processes may be used to spray dry other components of the present adhesive system.

The particle size distribution is important for dry mixing of the first and second parts, and for adhesive binding performance of the lignocellulosic materials. In a preferred embodiment, 90% w/w of the particles of the first and second parts, based on the total weight thereof, have a size which is 100 mesh or smaller, and the remaining 10% w/w of the particles, based on the total weight thereof, have a size which is between 100 mesh and 30 mesh. In a more preferred embodiment, 90% w/w of the particles of the first and second parts, based on the total weight thereof, have a size which is between 200 mesh or smaller and the remaining 10% w/w of the particles, based on the total weight thereof, have a size which is between 200 mesh and 60 mesh. Preferably, the median size of the particles of the first and second parts is about 400 mesh and, more preferably, about 350 mesh.

Similarly, when the first and second parts are to be pre-mixed, the first part and the second part preferably have similar bulk densities to achieve a uniform or homogeneous mixture.

The aldehyde polymers are preferably selected from the group consisting of phenol-formaldehyde, resorcinol-formaldehyde, urea-formaldehyde, melamine-urea-formaldehyde and melamine-formaldehyde polymers, and mixtures thereof.

The phenolic resoles are preferably spray dried from aqueous phenol-formaldehyde resole resin solutions and have a formaldehyde/phenol mole ratio of about 3:1 to about 1.1:1.

The modified phenolic resoles may be phenolic resoles modified with members selected from the group consisting of kraft lignin, kraft liquor, lignin, lignosulfonates, cashew shell extract, pecan shell extract, urea, melamine-formaldehyde resins, urea-formaldehyde resins, protein, tannin, and combinations thereof.

The tannin and modified tannin may be selected from the group consisting of mimosa (wattle) tannin, pine tannin, quebracho tannin, hemlock tannin, mangrove bark tannin, gambier tannin, and mixtures thereof, and are preferably a mimosa (wattle) tannin.

The isocyanate polymer preferably has an isocyanate group (—NCO) content of at least 20% w/w based on the total weight of the isocyanate polymer.

In accordance with a second aspect of the invention, there is provided a method of making a composite product comprising the steps of:
a) providing an adhesive system consisting essentially of a first part and one of (a) a second part; (b) a third part, and (c) both the second part and the third part; the first part being selected from the group consisting of powdered tannins, powdered modified tannins, and mixtures thereof; the second part being a powdered component reactive with the first part and selected from the group consisting of aldehyde polymers, phenolic resoles, modified phenolic resoles, and mixtures thereof; the third part being a liquid polymeric isocyanate, wherein:
when the system consists essentially of the first part and (a) the second part, the weight ratio of the first part to the second part is from about 1:99 to about 65:35;
when the system consists essentially of the first part and (b) the third part, the weight ratio of the first part to the third part is from about 1:99 to about 65:35; and
when the system consists essentially of the first part and (c) both the second part and the third part, the first part is present in an amount from about 1% w/w to about 64% w/w, the second part is present in an amount of from about 1% w/w to about 64% w/w and the third part is present in an amount of from about 35% w/w to about 99% w/w;
b) providing lignocellulosic material to be bound together using said adhesive system to form said composite product;
c) adding said first part to said lignocellulosic material to coat said lignocellulosic material therewith;
d) adding said second part, when present, to said lignocellulosic material to coat said lignocellulosic material therewith;
e) adding said third part, when present, to said lignocellulosic material to coat said lignocellulosic material therewith; and
f) applying pressure and heat, for a specified time period, to the coated lignocellulosic material formed after steps (c), (d) and (e) to cure the adhesive system and thereby bind the lignocellulosic material together to form the composite product.

The present method involves adding the first, second and third parts to the lignocellulosic material in situ. The third part is not mixed together with the first and/or second parts prior to use in order to avoid the problem of limited pot life. The first, second and third parts may be added separately to the lignocellulosic material in situ and in no particular order. Alternatively, the first and second parts may be pre-blended as dry powders in certain ratios to suit the particular application and applied to the material in one step before or after addition of the third part. What is required is that all parts which are used are eventually added to the lignocellulosic material to coat the material and that the parts be properly combined to achieve the required curing reactions.

Preferably, the amount of adhesive system added is from about 2.0 to about 12% w/w based on the weight of the lignocellulosic material. The amount of adhesive system to be used is dependent on various factors readily apparent to the person skilled in the art. These factors include the composition of the adhesive system, the type of lignocellulosic material used, including its geometry and size, and the temperature, pressure and time parameters used in the press operation (step (f) above). These parameters are readily determinable by the person skilled in the art using simple experimentation and are themselves dependent on the amount of adhesive system applied, the actual composition of the adhesive system, and the type of lignocellulosic material used, including its geometry and size. Typically, the coated lignocellulosic material is heated to a temperature in the range of from about 160° C. to about 230° C. and more preferably from about 200° C. to about 220° C. Also, the material is typically subjected to a pressure in the press which is in the range of from about gauge pressure 750 psi to about gauge pressure 2000 psi, and more preferably from about gauge pressure 1400 psi to about gauge pressure 1700 psi.

The amount of time used in the pressing operation affects the properties of the final composite product. The press may be a single opening press, multiple opening press, or a press which uses a continuous process. Typically, the press time is from 100 seconds to 600 seconds and more preferably from 120 seconds to 240 seconds.

The present adhesive system is preferably used to bind together lignocellulosic material consisting of wood strands, wood wafers, or straw particles to form a composite product which may be an OSB structured panel, wafer board, straw board, or a layer thereof or of another type of composite board.

In accordance with a third aspect, the invention provides a composite product made using the present adhesive system. As mentioned above, the composite product may be a composite board (e.g. OSB, wafer board, strand board, etc.) or a layer thereof. While a multi-layer composite board can be made with the same lignocellulosic material and adhesive system employed throughout, typically, composite boards comprise a plurality of different layers in which different wood products and/or different adhesives are employed. The amount of adhesive system binder used in each layer, and the composition of the adhesive used in each layer, may vary, as is known in the art of composite board manufacture.

There are many advantages associated with the present adhesive system. As mentioned above, the present invention uses a harmless, natural, and renewable resource (i.e. tannin or modified tannin from trees) to replace a portion of prior art binders which have numerous disadvantages noted above. Thus, the invention helps to minimize the negative impact of such prior art binders and/or reduce the cost of the adhesive system. When tannin or modified tannin is used to replace a portion of adhesives derived from petroleum-based non-renewable resources normally indexed to the price of crude oil and energy, fluctuations in the price of the adhesive can be better controlled.

Adhesive systems, consisting only of the first and second parts, when used in the manufacture of a composite board, have been found to result in lower formaldehyde emissions from the blender, forming line, press, and from the final composite product, as compared to adhesive systems consisting only of the second part, the second part in combination with the third part, or having added formaldehyde or paraformaldehyde catalysts. It is believed that, as the adhesive cures, the tannin attaches itself to active and unstable methylol groups and to excess formaldehyde and/or to as yet unreacted formaldehyde in the aldehyde resin, thereby "capping" these groups and preventing formaldehyde release.

Furthermore, the time required to cure the adhesive system can be adjusted to suit the application on site. This can be done by varying the amount of the first part relative to the second part, in a two part system. When the ratio of the weight of the first part to the weight of the second part is less than 1:4, increasing the amount of the first part relative to the second part will result in an increase in the cure time and plastic flow rate of the two part mixture, and vice versa.

Adhesives having slower cure times are desirable when forming an outer layer of a composite board. As the outer layer receives more heat in the press than inner layers, a slower curing adhesive in the outer layer prevents the outer layer from curing prior to curing of the inner layer(s). When the weight ratio of the first part to the second part is greater than 1:4 (e.g. 1:1), it has been observed that the cure time and plastic flow rate will decrease as the amount of the first part is increased relative to the amount of the second part, and vice versa.

Another advantage is that an adhesive system consisting only of the first and second parts is stable in storage and performs in a predictable manner. The components do not react until actually used in the press.

The system is also easier to use than prior art liquid adhesive systems which require an additional step of pre-mixing of the components by batch process or continuous means prior to use at the composite board manufacturing mill. In prior art liquid systems containing tannin and a formaldehyde generating 'donor' catalyst, the catalyst must be measured accurately to achieve the desired cure properties. The present system is more forgiving when it comes to measuring out the ingredients. The manufacturing process is further simplified by the fact that the first and second parts can be supplied pre-mixed and applied to lignocellulosic material in one step of the composite board manufacturing process. When adding the first and second parts in separate steps, the cure time and board properties may be adjusted by adjusting the amount of the first part relative to the second part.

An adhesive system according to the invention can be used to produce commercially acceptable composite boards. The properties of these composite boards will vary with the actual composition of the adhesive system used, the temperature of press platens, the time in the press, the pressure applied, and the time the board spends in hot post-curing.

The invention may be better understood with reference to the following description of the preferred embodiments.

DETAILED DESCRIPTION OF THE PREFERRED EMBODIMENTS

Commercially available tannin, modified tannin, aldehyde polymers, phenolic resoles, and modified phenolic resoles typically include fillers or extenders. Examples of typical extenders/fillers include calcium carbonate, water (in small amounts), and starches. In addition, components of the second part may contain cross-linking accelerants, as are known in the art. Thus, all references herein to these components of the present inventive adhesive system are references to commercially available forms of these components which include such additional ingredients as are typically included in their commercial forms.

For the sake of convenience, unless otherwise specified, when used hereafter, the term "tannin" shall mean both tannin and modified tannin. When used herein, "modified tannin" means a natural tannin modified by hydrolysis, sulfonation, methylation, acetylation (acylation), or conversion to a metal salt.

Tannins are natural long chain complex molecular substances falling into two groups: the pyroguallol group and the catechol group. The tannins useful herein as adhesive components come from the catechol group. Since tannin is a natural high molecular weight extract sourced from various trees, the actual molecular structure, reactivity, and performance as an adhesive varies. Because the present invention involves adding dry powdered tannin to the ligno-cellulosic material, the tannin and other components of the present system do not cure before actual use in situ. Thus, more varieties or kinds of tannins may be used in the present adhesive system which avoids the limited pot life problem discussed above.

The molecular weight of catechol tannins range from 200–2500 Daltons depending on the natural source, and the extraction and post extraction modification processing techniques. Tannins used herein for adhesives are natural tannin extracts and post extraction modified tannins.

In the art, the term MDI is often used generically to mean any one of a number of isocyanate polymers or polymeric urethanes. An example is polymeric 4—4 diphenyl methane diisocyanate which has been used in wood binders systems for 20 years. For the sake of convenience and clarity, when used herein, the term "MDI" shall mean isocyanate polymer (s), unless otherwise specified.

The present invention provides a novel adhesive system and method of using same to form a composite product. The dry components of the adhesive system may be pre-mixed off site or mixed on site at the OSB blender. In an adhesive system according to the present invention consisting of the first and second parts only, specific amounts of powdered, micropulverised, or spray dried powder tannin, modified tannin, or mixtures thereof, are used with specific amounts of powdered, micropulverised, or spray dried component reactive with the tannin and selected from the group consisting of aldehyde polymers, phenolic resoles, modified phenolic resoles, and mixtures thereof. The present adhesive system does not contain added cross-linking accelerants. Examples of such accelerants include paraformaldehyde, hexamine tetramine (hexa), or urea-formaldehyde concentrate (UFC 80™, UFC 85™). Under these conditions, it is believed that the formaldehyde deficient tannin molecule is forced to 'scavenge' free formaldehyde from the dry phenolic powder and reactive methylol linkages on the phenolic molecule. The adhesive system may further include liquid MDI which is added to the furnish (i.e. lignocellulosic material) in situ to avoid the problem of pre-cure or limited pot life of the adhesive system.

A preferred method of making a composite product, in the form of an oriented strand board, using the present adhesive system, will now be described. The person skilled in the art will readily understand how to adapt the below described method to make other composite boards, such as wafer boards, straw boards, fibre boards and chip boards.

In order to make OSB, bark is first stripped from wet logs. Then the debarked logs are cut into suitable lengths and fed into a flaker where they are reduced into thin flakes which are fractured to produce narrow, thin strands of wood. These wood strands are dried to reduce their moisture content from roughly 40–50 percent to about 5 percent of the total mass.

Next, in a rotating blender/mixer, the dried strands are treated with a suitable petroleum based "slack" wax or wax emulsion. A suitable wax emulsion is sold in association with the trade-mark Cascowax EW-58A by Borden Chemical, U.S.A.

The wax helps repel water in the finished OSB board as well as seal some of the uneven surfaces of the strands to prevent excess absorption of the adhesive by the wood strands. The person skilled in the art will appreciate that wax is normally not required in the manufacture of straw board because of its waxy surface nature.

An adhesive system according to the present invention is then added to coat the wax coated wood strands. In this preferred embodiment, the first part consists of a mixture of tannin and modified tannin derived from mimosa (wattle)

bark. The tannin and modified tannin is spray dried to a powder state and is sold in association with the trade-mark Bondtite 345 Mimosa A by Bondtite Inc. of South Africa. The second part is a mixture of base catalyzed spray dried phenol formaldehyde resole resins with a formaldehyde/ phenol mole ratio of about 3:1 to about 1.1:1 sold by Tembec, Inc. in association with the trade-mark SPOO7. Other useful phenolic resole resins are also available from Tembec, Inc. and sold under product codes SP900, SP906, CP820, and CP777. More particularly, the second part consists of a mixture of urea-formaldehyde resins and melamine-formaldehyde resins which supply a formaldehyde source. The system also includes a third part consisting of polymeric isocyanate sold in association with the trade-mark BASF Lupranate M205b by BASF, Inc., U.S.A. and Tembec, Inc. The polymeric isocyanate supplies reactive —NCO (i.e. isocyanate) groups.

The first, second and third parts of the system are added in that order consecutively and in separate steps. It will be appreciated, however, that two or more parts may be added in a single step. As mentioned above, the first and second parts may be pre-mixed and added in one step. The first and second particulate parts are blown or dropped onto the wood strands, while the liquid third part is sprayed onto the wood strands. Fresh strands are fed in at one end of the rotating blender and adhesive coated strands leave at the other end. The amount of adhesive that is applied can be varied by adjusting the meters of the adhesive delivery systems.

The adhesive coated strands are then laid in mats which will form respective layers of the final OSB. When forming mats which will become outer layers of the OSB, the strands are normally aligned in the long direction of the board. For inner layers, the strands are made to cross or are randomly aligned. The OSB's strength comes mainly from the uninterrupted wood fibre, interweaving of the long strands and wafers, and the degree of orientation in the surface layers. The result is a five layer composite mat of oriented strands which is 7" to 10" thick. Thereafter, the strand-laden continuous mat is loaded into a single opening press where heat and pressure are applied simultaneously for a specific period of time such as 240 seconds in order to compress the mat to a desired thickness and activate the curing of the adhesive system, thereby bonding the strands into structural strand board panels. Instead of a single opening press, a multi opening press (example 12 sets of platens, and 12 openings) or a continuous press system may be used. The 'master' or large panels coming out of the press are then cut to size.

It will be appreciated that the parts of the adhesive system can be used concurrently or sequentially in a series of blenders, rather than in a single blender, to achieve specific results for the mill or OSB panel grade being run. An OSB board line may have from 3 to 5 blenders and forming lines prior to the OSB press, one or more for each layer of the final board. Each blender may empty into its own oriented strand forming section prior to all lines sandwiching into the final panel layer configurations at the press. Typically, there are multiple blenders and forming lines converging to form one final multi-layer mat to produce an OSB board (3 to 5 layers) depending on the board thickness, board structural design, and the quality of the furnish.

It will also be appreciated that the furnish may contain wood components other than strands, such as fines.

The manufacture of other composite boards, such as wafer boards and chip boards, follows a similar process. Straw board is made by a different process and is not detailed herein. Other composite boards are made with starting lignocellulosic materials which differ from the wood strands used in OSBs in terms of their size and geometry. Typically, such materials are wood components such as wood chips, wood fibres, shavings, veneers, wood wool, cork, bark, sawdust, and the like. Particles of other lignocellulosic material such as shredded paper, pulp or vegetable fibres such as corn stalks, straw, bagasse and the like may also be used. Optionally, non-lignocellulosic materials such as shredded scrap rubber, polyurethane, polyisocyanate and like cellular and non-cellular polymers can be added.

EXAMPLE I

Trials were conducted with an adhesive system consisting of only the first and second parts, i.e. a dry particulate adhesive system. In this system, the first part consisted of a spray dried commercial grade modified (i.e. by hydrolysis) tannin powder derived from the mimosa tree and sold commercially in association with the trade-mark Bondtite 345 by Bondtite Inc. of South Africa. This tannin belongs to a group of tannins referred to generically as Mimosa tannins which are available from a variety of commercial sources including Bondtite, Inc. Bondtite's spray dried Bondtite 345 tannin is reported to have a molecular weight of between 900 and 1000 Daltons. For the sake of convenience, when used hereafter, the term "Mimosa A" shall mean the Bondtite 345 tannin. However, "mimosa" shall be understood to be a generic term for tannins derived from the mimosa (or wattle) tree.

The second part consisted of a production grade spray dried modified phenol-formaldehyde resole resin powder (referred to hereinafter as "Resin A"), available commercially from Tembec, Inc. of Temiscaming, Quebec and sold under product code SPOO7 and normally used as a surface layer OSB resin.

Resin A has the following product specifications:

(all below measurements were taken after Resin A was spray dried)

| | |
|---|---|
| Amount of free formaldehyde: | 1.0% w/w based on the weight of Resin A |
| Fusion melt disc diameter (150° C.): | 33–43 mm |
| Hot plate (150° C.) spatula Knead cure time of powder: | 30–40 seconds |

"Fusion melt disc diameter" is a measure utilized in a standard test procedure used by resin suppliers and mill technical personnel. The test is used to determine the fluidity of a fusible heat reactive resin when heated on a hot plate at a temperature of 150° C. and at a pressure of 68 psi. The hot plate is a thermoelectric stainless steel hot plate, preheated to 150±1° C. 0.5 grams±0.01 grams of resin is weighed onto a piece of transfer paper. Using a Parr™ pellet press, a pellet is made from the resin having a diameter of 12.7 mm and a height of 6.0 mm. The pellet is then transferred onto the preheated hot plate which is lined with aluminum foil. A glass plate having a length of 4", a width of 3", and a height of 1/16", is placed on top of the pellet and an aluminum or steel cylinder weighing 6 kg is placed on top of the glass plate. After 3 minutes, the glass plate and weight are removed and the diameter of the melted pellet is measured at four places. The "fusion melt disc diameter" is the average diameter resulting from the measurements.

"Hot plate (150° C.) spatula knead cure time of powder" is the time required to cure a spray dried powdered resin under the following conditions. A hot plate is heated to 150±1° C. as in the case of the above "fusion melt disc diameter" test. 0.25 grams±0.01 grams of powdered resin is weighed, transferred onto a stainless steel spatula, and then transferred onto the hot plate. The resin is slowly kneaded with a spatula and the time, in seconds, taken for the powder to melt, plasticize and then fully cure, with no remaining signs of plasticity, is measured. The resulting measurement is the "hot plate (150° C.) spatula knead cure time of powder".

Mimosa A was dry blended via a metering auger into a continuous air conveyed stream of the spray dried phenolic powder (Resin A) to achieve a thoroughly mixed adhesive system having a weight ratio of tannin to Resin A of 1:10.

The following properties of the adhesive system and of the individual components thereof were noted and are shown in Table I below.

TABLE I

|  | Mimosa A (Part 1) | Resin A (Part 2) | Adhesive System (Mimosa A and Resin A) (Parts 1 and 2) |
| --- | --- | --- | --- |
| Free formaldehyde | 0.0% w/w | 1.0% w/w | .95% w/w |
| Fusion melt disc diameter | N/A no flow measurable | 34 mm | 39 mm |
| Hot plate (150° C.) (150° C.) spatula cure time | 5 seconds | 31 seconds | 35 seconds |

The free formaldehyde amount is based on the total weight of the tested components or adhesive system, as the case may be.

Without being bound by theory, it is believed that the increase in the plastic flow rate (i.e. the larger fusion melt disc diameter) and in the hot plate cure time of the adhesive system versus Resin A alone, is due to the fact that inter-reactions of tannin and phenolic are occurring and that when the adhesive system is used in an OSB press mill, the tannin will react with free formaldehyde in the phenolic resin powder to form tannin methylol groups and subsequently the methylol groups in the phenolic molecule will condense with hydroxyl phenol sites on the tannin molecule and the tannin methylol groups will further polymerize with the phenolic molecules.

Free formaldehyde is normally present in spray dried phenolic resole resins to facilitate a faster cure in the press. The initial increase in plasticity and cure time of the adhesive system as compared to Resin A alone is believed to be a result of the tannin "scavenging" the free formaldehyde at the expense of the phenolic resole resin's reactivity, thereby slowing down the rate of cure of the phenolic resole resin.

Continued heat input and longer elapsed time are believed to activate the final cross-linking, via methylene bridges, of tannin to phenolic resole resin, phenolic resole resin to phenolic resole resin and tannin to tannin. It is believed that this is a more efficient use of methylol sites and free formaldehyde from the virgin phenolic resole resin because a non-formaldehyde naturally occurring high molecular weight polyphenolic polymer (Mimosa A tannin) is joined to a manufactured polymerized phenol-formaldehyde polymer. The result is a lower over-all weight ratio of formaldehyde to the adhesive system as compared to systems consisting only of the second part, or the second and third parts. This lower weight ratio of formaldehyde to adhesive system uses less formaldehyde than many prior art tannin containing adhesive systems.

In the manufacture of composite boards, the boards are typically "hot stacked" after the pressing operation. "Hot stacking" refers to the process of removing the pressed boards from the press and stacking them in a pile, for example at 130° C. for one hour. The stacked boards are then allowed to cool overnight in a controlled humidity (84%) chamber. Prior art OSB boards manufactured with a phenolic resin binder, alone or in combination with MDI binder, normally improve in terms of their mechanical strength and water resistance properties during hot stacking. There is typically a 20% improvement in these properties resulting from continued cross-linking (curing) of the aldehyde containing part of the adhesive system. The present invention improves on this process of continued cross-linking by, in the inventor's belief, the tannin "scavenging" additional fugitive formaldehyde escaping from the OSB panel. Furthermore, it is believed that the tannin reacts with the formaldehyde present and further reacts with the methylol groups on the phenolic resole resin molecules to cap those groups and, in this way, reduces the number of sites where future formaldehyde emissions can originate. Thus, it is expected that the de-gasification of formaldehyde in composite boards made using the present adhesive system, at higher altitudes, or in aircraft, will be minimized.

Although the ratio of phenolic resole resin to tannin in the above example was 10:1, adhesive formulations containing phenolic resole resin to tannin ratios of 4:1 and 1:1 were tested and achieved similar or good results.

The storage stability of dry particulate adhesive systems containing only the first and second parts has been found equivalent to the stability of spray dried phenolic resoles.

While reference will be made generically to OSBs throughout the remainder of this specification, it should be understood that this invention is applicable to other equivalent forms of this type of product. Similarly, the method of the present invention and its associated advantages can be achieved with respect to various forms of lignocellulosic starting material and is not limited to any particular form. However, wood strands, wood wafers and straw particles comprise the preferred embodiments of lignocellulosic materials used in the method of the present invention.

EXAMPLE II

Adhesive systems according to two further embodiments of the invention (Formulations A and B) were formulated and tested against a control (Formulation C) in the production of OSB boards made from strands of southern yellow pine and sweet gum wood species. Dosage rates for board production were left identical to virgin phenolic powder rates. Blender conditions, forming conditions and press conditions were not varied for tannin containing resins for the tests. The board made with the tannin/phenolic resin exhibited the same or superior properties i.e. mechanical and IB (internal board) strength, water absorption, and swell.

The OSB boards produced and tested each had a top and bottom surface layer bound together using the same adhesive (either Formulations A, B, or C) and a core layer bound together using only a spray dried phenolic resole resin (Formulation D).

All formulations are summarized in Table II below. Table II also lists the amount of adhesive system used (% w/w based on the total weight of the furnish).

TABLE II

| Adhesive System | Composition | Weight ratio tannin/Resin A | Adhesive Dosage % w/w based on weight of furnish |
|---|---|---|---|
| Formulation C control surface | Resin B | 0:100 | 3 |
| Formulation A surface | Mimosa A Resin B | 1:4 | 3 |
| Formulation B surface | Mimosa B Resin B | 1:4 | 3 |
| Formulation D Core Adhesive | Resin C | 0:1 | 3 |

Resin B is a production grade spray dried phenolic resole resin powder (Resin B) available commercially from Tembec, Inc. of Temiscaming, Quebec and sold under product code SP900 and normally used as a surface layer OSB resin.

Resin C is a spray dried phenolic resole resin available commercially from Tembec, Inc. of Temiscaming, Quebec under product code CP820 (Resin C).

Mimosa A is a tannin (modified by hydrolysis) sold in association with the trade-mark Bondtite 345 by Bondtite, Inc. of South Africa, and having a molecular weight of approximately 900–1000 Daltons. Mimosa A is derived from the Mimosa tree (wattle). Mimosa B (modified to a lower degree of effective hydrolysis than Mimosa A) is sold in association with the trade-mark Bondtite 645, also by Bondtite, Inc. Mimosa B has a molecular weight of approximately 800 Daltons and is less reactive with formaldehyde than Mimosa A.

The production of the OSB boards will now be described. All % w/w figures are based on the total weight of the furnish.

** Cascowax EW-58A wax emulsion was used throughout and is available from Borden Chemical, U.S.A.

Step A—Core Layer Production 1.5% w/w wax emulsion** was sprayed onto wood strands consisting of 50% w/w strands from sweet gum and 50% w/w strands from southern yellow pine. 3.0% w/w of Resin C was added to the wax emulsion coated strands and the mixture was tumbled for 4 minutes in a blender. Afterwards, the adhesive coated mixture was stored for mat forming and pressing.

Step B—Surface Layer Production (Using Formulation A)

1.5% w/w wax emulsion** was sprayed onto wood strands consisting of 30% strands from sweet gum and 70% w/w strands from southern yellow pine. Formulation A was then added at a dosage of 3.0% w/w to a blender full of the wax coated emulsion strands which were then tumbled for 4 minutes. Afterwards, the adhesive coated strands were stored for mat forming and pressing.

Step C—Surface Layer Production (Using Formulation B)

1.5% w/w wax emulsion** was sprayed onto wood strands consisting of 30% strands from sweet gum and 70% w/w strands from southern yellow pine. Formulation B was then added at a dosage of 3.0% w/w to a blender full of the wax coated emulsion strands which were then tumbled for 4 minutes. Afterwards, the adhesive coated strands were stored for mat forming and pressing.

Step D—Surface Layer Production (Using Formulation C)—Control 1.5% w/w wax emulsion** was sprayed onto a mixture of strands identical to the strand mixture used in forming the surface layers in Steps B and C. Formulation C was then added at a dosage of 3.0% w/w to a blender full of the wax coated strands which were then tumbled for 4 minutes. Afterwards, the adhesive coated strands were stored for mat forming and pressing.

Six 24"×24" OSBs, each having a thickness of 7/16" were made, two to test each of formulations A, B and C. Each OSB had three layers: a core layer (50% w/w) and two identical surface layers (each 25% w/w), one on either side of the core layer. The furnish moisture in the surface layers of all OSBs formed was 6.6% w/w. The furnish moisture in the core layer of all OSBs formed was 4.0% w/w. All OSBs had a core layer formed from the strands resulting from Step A above. OSB 1a and OSB 1b were made using adhesive coated strands formed in Step B using Formulation A above as the two identical surface layers. OSB 2a and OSB 2b were made with surface layers using the adhesive coated strands made in Step C above using Formulation B. OSB 3a and OSB 3b were made using adhesive coated strands formed in Step D and therefore had surface layers containing only Resin B in the surface and no tannin. OSB 3a and 3b served as controls.

All OSBs were formed under conditions summarized in Table III below.

TABLE III

| | |
|---|---|
| Support: | Screen at the bottom, ring on top 3'10 |
| Stop bars: | ½ + 1/100 + 1/100 |
| Press temperature: | 190° C. |
| Pressure | 1450 psi |
| Press time: | 190 seconds |

The OSBs were cut into test specimens and the specimens were then tested for mechanical and weathering properties. The results are summarized in Table IV below.

TABLE IV

| | Density Dry Lb/cu. ft. | Density Soaked Lb/cu. ft. | Density Boiled Lb/cu. ft. | Internal Bond Strength psi | Area of Break | Thickness swell Soaked %** | Water absorption Soaked %*** | Thickness swell Boiled % | Water absorption Boiled % |
|---|---|---|---|---|---|---|---|---|---|
| Formulation C (Control) (OSB3a) | 43.0 | 44.6 | 42.7 | 79.9 | C = 6 | 29.4 | 40.6 | 55.6 | 133.2 |
| Formulation C (Control) (OSB3b) | 43.1 | 45.2 | 42.3 | 78.0 | C = 7 | 28.9 | 38.0 | 53.4 | 131.7 |
| Average Formulation C (Control) | 43.1 | 44.9 | 42.5 | 79.0 | | 29.2 | 39.3 | 54.5 | 132.5 |
| Formulation A (OSB1a) | 42.9 | 45.7 | 41.7 | 85.4 | C = 7 | 29.3 | 37.0 | 50.6 | 134.1 |

TABLE IV-continued

|  | Density Dry Lb/cu. ft. | Density Soaked Lb/cu. ft. | Density Boiled Lb/cu. ft. | Internal Bond Strength psi | Area of Break | Thickness swell Soaked %** | Water absorption Soaked %*** | Thickness swell Boiled % | Water absorption Boiled % |
|---|---|---|---|---|---|---|---|---|---|
| Formulation A (OSB1b) | 43.1 | 43.4 | 44.0 | 82.2 | C = 7 | 28.0 | 34.9 | 57.6 | 132.0 |
| Average Formulation A | 43.0 | 44.6 | 42.9 | 83.8 |  | 28.7 | 36.0 | 54.1 | 133.1 |
| Formulation B (OSB2a) | 43.0 | 42.2 | 43.5 | 83.3 | C = 7 | 26.2 | 35.6 | 51.1 | 131.6 |
| Formulation B (OSB2b) | 42.9 | 45.8 | 42.4 | 74.5 | C = 8 | 28.0 | 35.4 | 52.2 | 133.0 |
| Average Formulation B | 43.0 | 44.0 | 43.0 | 78.9 |  | 27.1 | 35.5 | 51.7 | 132.3 |

"cu. ft" = cubic foot
C = core
**Thickness swell board % (wet thickness incremental over original dry thickness) after 24 hour soak at ambient temperature (20° C.)
***Water absorption % (weight absorbed/weight panel dry) after 24 hour soak in water at ambient temperature (20° C.)

Formulation A (OSB 1a and 1b) containing Mimosa A and Resin B produced internal bond strength values of from 82.2 to 85.4 psi which is higher than the values obtained for the control, Formulation C(OSB 3a and 3b) (internal bond strength from 78–79.9 psi). Formulation B containing Mimosa B, and Resin B produced internal bond strength values of from 74.5–83.3 psi which is, on average, lower than the results obtained for Formulation A. Mimosa A tannin (modified by hydrolysis) is specifically modified to be very reactive with formaldehyde and this is evidenced by the above results.

Formulations A and B gave rise to better results in water absorption in the 24 hour soak test as compared to the control Formulation C. Other test results were approximately equivalent to the results obtained for the control. It is believed that the internal bond strength and water resistance of the OSB boards containing Formulations A and B are enhanced by the action of the tannin scavenging ('catching') the formaldehyde being released by the phenolic resole resin during pressing and curing.

EXAMPLE III

Adhesive System Containing MDI

An adhesive system according to a further preferred embodiment was tested in the manufacture of a straw board composite fibre panel. It was found that a panel formed using 2.4% w/w MDI and 1% w/w Mimosa A (based on the total weight of the furnish) produced a commercially viable product. The MDI used was an isocyanate polymer available commercially from BASF, Inc. of Geismar, La. and sold in association with the trade name BASF Lupranate M205B. Furthermore, the MDI had an isocyanate group (—NCO) content of about 31.5% w/w based on the weight of the isocyanate polymer. However, it is believed that adhesive systems containing MDI with an isocyanate group (—NCO) content of at least 20% w/w would still be effective in adhesive systems according to the invention.

EXAMPLE IV

Further embodiments of the present adhesive system containing 48 to 49% w/w of MDI were used to make additional OSBs which were then tested. Six, three layer 7/16" OSB panel boards were made from 100% poplar wood strands and tested. The binder systems used are summarized in Table V below. Part 1 (p2) refers to the first part of the adhesive system. Part 2 (p2) refers to the second part of the adhesive system. Part 3 (p3) refers to the third part of the adhesive system. The identity of the components used in each part is given below in Table V.

The formulations were made up such that the ratio of Part 1 and Part 2 to Part 3 MDI ranged as follows:

| Formulation Ratio w/w (Part 1 + Part 2):Part 3 | |
|---|---|
| Surface Layers: | 48.3:51.7 |
| Core Layers: | 49.2:50.8 |

TABLE V

FORMULATIONS FOR EVALUATING THE REPLACEMENT OF 48–49% OF MDI BY THE PREFERRED ADHESIVE SYSTEM

| Preferred Adhesive System Ratios (used in surface layers) | | | Surface layer binder formulation | | | | Core layer binder formulation | | | | Preferred Adhesive System Ratio (Used in core layer) | |
|---|---|---|---|---|---|---|---|---|---|---|---|---|
| P1:P2 | (P1 + P2):P3 | Board | Total Surface binder % w/w | Surface Powder Tannin % w/w | Surface Powder Phenolic % w/w | Surface Liquid MDI % w/w | Total Core Binder % w/w | Core Powder Tannin % w/w | Core Powder Phenolic % w/w | Core Liquid MDI % w/w | P1:P2 | (P1 + P2):P3 |
| 0:100 | 48:52 | Board 1 | 2.9 | 0 Mimosa A | 1.4 resin E | 1.5 MDI | 2.56 | .0 | 1.26 Resin E | 1.3 MDI | 0:100 | 49:51 |

TABLE V-continued

FORMULATIONS FOR EVALUATING THE REPLACEMENT OF 48–49% OF MDI BY THE PREFERRED ADHESIVE SYSTEM

| Preferred Adhesive System Ratios (used in surface layers) | | | Surface layer binder formulation | | | | Core layer binder formulation | | | | Preferred Adhesive System Ratio (Used in core layer) | |
|---|---|---|---|---|---|---|---|---|---|---|---|---|
| P1:P2 | (P1 + P2):P3 | Board | Total Surface binder % w/w | Surface Powder Tannin % w/w | Surface Powder Phenolic % w/w | Surface Liquid MDI % w/w | Total Core Binder % w/w | Core Powder Tannin % w/w | Core Powder Phenolic % w/w | Core Liquid MDI % w/w | P1:P2 | (P1 + P2):P3 |
| 50:50 | 48:52 | Board 2 | 2.9 | 0.7 Mimosa A | 0.7 Phenolic resin F | 1.5 MDI | 2.56 | .63 Mimosa A | .63 Resin F | 1.3 MDI | 50:50 | 49:51 |
| 100:0 | 48:52 | Board 3 | 2.9 | 1.4 Mimosa A | 0 | 1.5 MDI | 2.56 | 1.26 Mimosa A | 0 | 1.3 MDI | 100:0 | 49:51 |
| 20:80 | 48:52 | Board 4 | 2.9 | .28 Mimosa A | 1.12 Phenolic resin G | 1.5 MDI | 2.56 | .252 Mimosa A | 1.008 Phenolic resin G | 1.3 MDI | 20:80 | 49:51 |
| 40:60 | 48:52 | Board 5 | 2.9 | .56 Mimosa A | .84 Phenolic resin H | 1.5 MDI | 2.56 | .504 Mimosa A | .756 Phenolic resin H | 1.3 MDI | 40:80 | 49:51 |
| 0 N/A | 0:100 | Board 6 | 2.5 | 0 | 0 | 2.5 MDI | 2.56 | 0 | 0 | 2.5 MDI | 0 N/A | 0:100 |

Resin E: Commercial Core Resole Type Spray Dried Phenol-Formaldehyde Resole Resin CP777, with a F/P (formaldehyde to phenol) mole ratio of approximately 2.1:1, available from Tembec, Inc.
Resin F: Commercial Surface Type Spray Dried Modified Phenol-Formaldehyde Resole Resin SP906, with a F/P mole ratio of approximately 1.9:1, available from Tembec Inc.
Resin G: Developmental Spray Dried Modified Phenol-Formaldehyde Resole Resin sold under product code # G-1-12-B, with a F/P mole ratio of approximately 1.6:1, and available by special order from Tembec, Inc.
Resin H: Developmental Spray Dried Modified Phenol-Formaldehyde Resole Resin sold under product code # G-1-14-C, with a F/P mole ratio of approximately 1.6:1, and available by special order from Tembec, Inc.
Mimosa A Tannin (described above in Example 1).

The six boards were produced under the following conditions to produce a target density of 38–39 lb/cu. ft.

| | |
|---|---|
| Platen temperature | 215° C. |
| Gauge pressure | 1620 psi |
| Press time | 125 seconds |
| Hot stacking | 1 hr at 130° C. |

Further details of the OSBs produced and tested are given in Table VI below.

TABLE VI

BOARD LAYER CONFIGURATION FOR ALL 6 FORMULATIONS

| | Moisture content in furnish % w/w | Wax** % | Binder in 3 layer board | Mass distribution % w/w |
|---|---|---|---|---|
| Top | 8.1 | 1.5 | Binders in Top Board layer as per below | 25 |
| Core | 4.3 | 1.0 | Binders in Core layer as per below | 50 |
| Bottom | 8.1 | 1.5 | Binders in Bottom layer same as Top as per below | 25 |

**Cascowax EW-58A ™ wax emulsion was used throughout and is available from Borden Chemicals, U.S.A.

Tests to indicate the relative effect on properties by replacing 48–49% of the MDI in the binder were conducted as follows:

Test 1-IB (Internal Board Strength)

Test 2-Thickness Swell after finished board is placed in ambient temperature (20° C.) water for 24 hours.

Test 3–24 hour Water Absorption by placing finished boards into water for 24 hours at ambient temperature (20° C.) water.

All tests were conducted in accordance with ASTM standards ("ASTM 1037–99) and the results are summarized in Table VII below.

TABLE VII

Various board properties for substituted MDI formulations as tested for 125 seconds press time

| Board | Binder in Test | Density Dry Lb/cu. ft. | Internal bond strength psi | Number of core failures* | Thickness swell 24 hr. soak %** | Water absorption 24 hr soak %*** |
|---|---|---|---|---|---|---|
| 1 | Resin E/MDI | 37.9 | 54.8 | C = 6 | 9.5 | 19.9 |
| 2 | Mimosa A/Resin F/MDI | 39.7 | 60.7 | C = 5 IB = 1 | 9.9 | 20.6 |
| 3 | Mimosa A/MDI | 39.2 | 64.9 | C = 6 | 8.5 | 20.0 |
| 4 | Mimosa A/Resin G/MDI | 38.7 | 58.1 | C = 7 | 9.3 | 22.3 |
| 5 | Mimosa A/Resin H/MDI | 38.8 | 58.5 | C = 5 | 9.3 | 21.4 |
| 6 | MDI | 38.9 | 89.5 | C = 6 | 6.7 | 15.3 |

*Area of IB failures
Mimosa A Tannin (described above in Example 1)
**Thickness swell board % (wet thickness incremental over original dry thickness) after 24 hour soak at ambient temperature (20° C.)
***Water absorption % (weight absorbed/weight panel dry) after 24 hour soak in water at ambient temperature (20° C.).
IB = interface break between core and bottom layer of board
IT = interface break between core and top layer of board (none in these tests)

The substituted MDI boards had internal bond strength values ranging from 54.8 psi to 64.9 psi. The tannin: MDI board had the highest internal bond strength of the substituted MDI boards. All other tannin containing formulations in combination with phenolic resole resins and MDI produced higher internal bond strength values than the values produced from boards made with a binder containing only phenolic resole resin and MDI.

The thickness swell % measured by the 24 hour soak tests gave rise to a thickness swell of from 8.5% to 9.9% for the substituted MDI board. The tannin: MDI board showed the lowest thickness swell % of the substituted MDI board. The lower the thickness swell value, the more the board is resistant to water absorption and therefore thickness changes in high moisture atmospheres.

The 24 hour soak Water Absorption Test Results for the MDI substituted boards produced values of from 19.9 to 22.3%. The tannin: MDI board produced a value of 20% water absorption vs. 19.9% absorption for the phenolic: MDI board. Thus similar properties were observed. The type of phenolic resole resin used in the core and surface layers did not seem to affect the results.

MDI substituted board binder formulations all reached acceptable performance levels for certain grades of OSB, with tannin: MDI and tannin:phenolic: MDI systems performing better than phenolic: MDI systems. An additional experiment identical to the above experiment was run with boards pressed for 140 seconds instead of 125 seconds. This test produced boards having internal bond strength values which were higher for all 6 boards as compared to the boards pressed for 125 seconds. Also, the % water absorption values and % swell values were either unchanged or slightly better for all six boards.

As can be seen from the above results, binder formulations according to the present invention can be used to achieve results better than results achieved by prior art aldehyde containing adhesive formulations (phenolic+ MDI). The relative amount of Part 3 could be reduced further in the preferred adhesive system to make OSB boards with comparable properties to phenolic: MDI adhesive system boards. Since MDI, on a weight basis, is more expensive than tannin or phenolic resole resins, savings in cost can be obtained in the manufacture of OSBs and other composite boards.

It will be appreciated that various modifications to the preferred embodiments can be made and will be apparent to the person skilled in the art. The invention shall not be limited to the preferred embodiments but is defined in accordance with the following claims.

The invention claimed is:

1. An adhesive system for use in binding lignocellulosic materials into a composite product, the adhesive system consisting essentially of a first part and one of (a) a second part; (b) a third part, and (c) both the second part and the third part; the first part being selected from the group consisting of powdered tannins, powdered modified tannins, and mixtures thereof; the second part being a powdered component reactive with the first part and selected from the group consisting of aldehyde polymers, phenolic resoles, modified phenolic resoles, and mixtures thereof; the third part being a liquid polymeric isocyanate, wherein:
   when the system consists essentially of the first part and (a) the second part, the weight ratio of the first part to the second part is from about 1:99 to about 65:35;
   when the system consists essentially of the first part and (b) the third part, the weight ratio of the first part to the third part is from about 1:99 to about 65:35; and
   when the system consists essentially of the first part and (c) both the second part and the third part, the first part is present in an amount from about 1% w/w to about 64% w/w, the second part is present in an amount of from about 1% w/w to about 64% w/w and the third part is present in an amount of from about 35% w/w to about 99% w/w.

2. An adhesive system according to claim 1 wherein the first part, the second part, or the first part and the second part, are spray dried powders.

3. An adhesive system according to claim 1 consisting essentially of the first and second parts, wherein the weight ratio of the first part to the second part is from about 1:99 to about 20:80.

4. An adhesive system according to claim 3 wherein the weight ratio of the first part to the second part is from about 6:94 to about 15:85.

5. An adhesive system according to claim 4 wherein the weight ratio of the first part to the second part is about 1:8.

6. An adhesive system according to claim 1 consisting essentially of the first and third parts, wherein the weight ratio of the first part to the third part is from about 10:90 to about 65:35.

7. An adhesive system according to claim 6 wherein the weight ratio of the first part to the third part is about 35:65 to about 50:50.

8. An adhesive system according to claim 1 wherein 90% w/w of the particles of said first and second parts, based on the total weight thereof, have a size which is 100 mesh or smaller, and the remaining 10% w/w of the particles, based on the total weight thereof, have a size which is between 100 mesh and 30 mesh.

9. An adhesive system according to claim 1 wherein 90% w/w of the particles of said first and second parts, based on the total weight thereof, have a size which is 200 mesh or smaller, and the remaining 10% w/w of the particles, based on the total weight thereof, have a size which is between 200 mesh and 60 mesh.

10. An adhesive system according to claim 1 wherein the median size of the particles of the first and second parts is about 400 mesh.

11. An adhesive system according to claim 1 wherein the median size of the particles of the first and second parts is about 350 mesh.

12. An adhesive system according to claim 1 wherein the aldehyde polymers are selected from the group consisting of phenol-formaldehyde, resorcinol-formaldehyde, urea-formaldehyde, melamine-urea-formaldehyde, and melamine-formaldehyde polymers, and mixtures thereof.

13. An adhesive system according to claim 1 wherein the modified phenolic resoles are phenolic resoles modified with members selected from the group consisting of kraft lignin, kraft liquor, lignin, lignosulfonates, cashew shell extract, pecan shell extract, urea, melamine-formaldehyde resins, urea-formaldehyde resins, protein, tannin, and combinations thereof.

14. An adhesive system according to claim 1 wherein the phenolic resoles are selected from the group consisting of spray dried phenolic resoles with a formaldehyde/phenol mole ratio of about 3:1 to about 1.1:1.

15. An adhesive system according to claim 1 wherein the tannins and modified tannins are selected from the group consisting of mimosa (wattle) tannin, pine tannin, quebracho tannin, hemlock tannin, mangrove bark tannin, gambier tannin, and mixtures thereof.

16. An adhesive system according to claim 15 wherein the tannins and modified tannins are mimosa (wattle) tannins.

17. An adhesive system according to claim 1 wherein the isocyanate polymer has an isocyanate group (—NCO) content of at least 20% w/w based on the total weight of the isocyanate polymer.

* * * * *